United States Patent
Mayer et al.

(10) Patent No.: US 10,009,755 B2
(45) Date of Patent: Jun. 26, 2018

(54) OBTAINING OF ACCESS RIGHTS TO A NETWORK, IMPLEMENTED BY A COMMUNICATING OBJECT

(71) Applicant: Orange, Paris (FR)

(72) Inventors: Emmanuel Mayer, Ifs (FR); Mohammed Achemlal, Caen (FR)

(73) Assignee: ORANGE, Paris (FR)

( * ) Notice: Subject to any disclaimer, the term of this patent is extended or adjusted under 35 U.S.C. 154(b) by 0 days. days.

(21) Appl. No.: 15/539,949

(22) PCT Filed: Dec. 18, 2015

(86) PCT No.: PCT/FR2015/053646
§ 371 (c)(1),
(2) Date: Jun. 26, 2017

(87) PCT Pub. No.: WO2016/102855
PCT Pub. Date: Jun. 30, 2016

(65) Prior Publication Data
US 2018/0007542 A1    Jan. 4, 2018

(30) Foreign Application Priority Data
Dec. 24, 2014 (FR) ...................... 14 63341

(51) Int. Cl.
*H04M 3/00* (2006.01)
*H04W 8/20* (2009.01)
(Continued)

(52) U.S. Cl.
CPC ........... *H04W 8/205* (2013.01); *H04W 88/04* (2013.01); *H04W 12/06* (2013.01); *H04W 12/08* (2013.01); *H04W 88/06* (2013.01)

(58) Field of Classification Search
CPC ..... H04W 12/06; H04W 84/12; H04W 12/08; H04W 4/008; H04W 48/10; H04W 88/10;
(Continued)

(56) References Cited

U.S. PATENT DOCUMENTS

2002/0072356 A1* 6/2002 Yamashita ........ H04M 1/72533
455/420
2006/0133336 A1* 6/2006 Oh ..................... H04N 7/17318
370/338
(Continued)

OTHER PUBLICATIONS

International Search Report dated Mar. 1, 2016 for corresponding International Application No. PCT/FR2015/053646, filed Dec. 18, 2015.
(Continued)

*Primary Examiner* — Nimesh Patel
(74) *Attorney, Agent, or Firm* — David D. Brush; Westman, Champlin & Koehler, P.A.

(57) ABSTRACT

A method performed by a communicating object to obtain rights to access a communications network. The object initially has rights limited to exchanging data with a rights management platform of the network. The method includes: sending a signaling message to the platform; and receiving a communications profile specific to the network. The profile is associated in the network with rights specific to the object, referred to as "delegated" rights. The delegated rights are defined on the basis of network access rights associated with a user of the object and referred to as "initial" rights. The delegated rights are suitable for enabling the communicating object to access the communications network.

11 Claims, 4 Drawing Sheets

(51) Int. Cl.
*H04W 88/04* (2009.01)
*H04W 12/06* (2009.01)
*H04W 88/06* (2009.01)
*H04W 12/08* (2009.01)

(58) Field of Classification Search
CPC ... H04W 88/02; H04W 48/18; H04W 76/023; H04W 4/021; H04W 74/00; H04W 72/1252; H04W 72/1257; H04W 74/0833; H04W 74/085; H04W 4/22; H04W 4/023; H04W 4/025; H04W 4/04; H04W 12/12; H04W 64/00; H04W 52/0264; G08B 25/008; G08B 19/005; G08B 27/003; G08B 29/185; G08B 25/002; G08B 25/006; G08B 27/005; G08B 3/10; G08B 13/00; G08B 13/196; G08B 25/00; G08B 25/016; G08B 25/08; G08B 25/14; G08B 7/06

See application file for complete search history.

(56) References Cited

U.S. PATENT DOCUMENTS

| 2008/0081611 | A1 | 4/2008 | Hoyt et al. | |
| 2014/0101781 | A1* | 4/2014 | Bouknight | G06F 21/10 726/28 |
| 2014/0237101 | A1 | 8/2014 | Park | |
| 2015/0061859 | A1* | 3/2015 | Matsuoka | G08B 27/00 340/501 |
| 2016/0088438 | A1* | 3/2016 | O'Keeffe | H04R 27/00 455/456.2 |

OTHER PUBLICATIONS

English translation of the International Written Opinion dated Mar. 1, 2016 for corresponding International Application No. PCT/FR2015/053646, filed Dec. 18, 2015.

* cited by examiner

FIG.6

OBTAINING OF ACCESS RIGHTS TO A NETWORK, IMPLEMENTED BY A COMMUNICATING OBJECT

CROSS-REFERENCE TO RELATED APPLICATIONS

This Application is a Section 371 National Stage Application of International Application No. PCT/FR2015/053646, filed Dec. 18, 2015, the content of which is incorporated herein by reference in its entirety, and published as WO 2016/102855 on Jun. 30, 2016, not in English.

FIELD OF THE INVENTION

The invention relates to the general field of telecommunications.

The invention relates more particularly to the field of managing the access rights of a communicating object to a communications network.

BACKGROUND OF THE INVENTION

A "communicating" or "connected" object is a term used herein to designate an object having the ability to exchange information via a communications network either with another object, or with a communications terminal, or indeed with computer equipment of the communications network. Thus, both a mobile terminal, and a watch adapted for transmitting information to a mobile terminal via an extended communications network, such as the Internet, constitute examples of connected objects.

In order to connect the communicating object to a communications network, it is necessary to use either a subscription to the communications network that is specific to the communicating object, or else an access gateway that itself possesses a subscription to the communications network. By way of example, such an access gateway may be a home gateway giving access to the service of a communications network operator, or it may be a mobile telephone configured as an access gateway.

The first solution presents the advantage of enabling the communicating object to connect itself with all of the access points of the communications network that are compatible with the connection means of the communicating object, and to do so in a manner that is independent and transparent for its user. However it presents the drawback of being expensive since it assumes taking out as many subscriptions as there are communicating objects for connecting to the communications network.

The second solution is less expensive, since it requires the use of only one subscription to the communications network, regardless of the number of objects to be connected. Nevertheless, the second solution is not satisfactory, since in order to connect a communicating object to a communications network, it requires prior pairing of the communicating object with a given access gateway. Consequently, the communicating object can access the communications network only if it is in the vicinity of the access gateway. If this condition is not true, then prior to being able to connect with the communications network, the communicating object will need once more to be paired, but with another access gateway that is situated in its vicinity.

Consequently, connecting a communicating object to a communications network is an operation that is either expensive or difficult to carry out.

SUMMARY OF THE INVENTION

An exemplary embodiment of the present disclosure relates to, in a first aspect, a method of managing the rights of a communicating object, the method being performed by a rights management platform of a communications network. The rights management method comprises:
  a step of receiving a signaling message coming from a communicating object;
  a step of sending to at least one device located in the proximity of the communicating object a list comprising at least one identifier of a communicating object located in the proximity of the device;
  a step of receiving, from the device, a message comprising the identifier of a communicating object in the list, the device having rights to access the communications network that are associated with a user of the device and that are referred to as "initial" rights;
  a step of sending to the device a description message containing a list of rights that may be allocated to the selected object, which allocatable rights are defined on the basis of the initial rights;
  a step of receiving, from the device, a request message requesting that rights be set up, the message comprising a description of the rights belonging to the object, referred to as "delegated" rights, as selected from the list of allocatable rights;
  a step of creating a communications profile associated with the delegated rights; and
  a step of sending the profile to the object in order to configure it.

Correspondingly, the invention also provides a rights management platform for managing the rights of a communicating object, the platform being associated with a communications network. The platform comprises:
  a module for receiving a signaling message coming from a communicating object;
  a module for sending to at least one device located in the proximity of the communicating object a list comprising at least one identifier of a communicating object located in the proximity of the device;
  a module for receiving, from the device, a message comprising the identifier of a communicating object in the list, the device having rights to access the communications network that are associated with a user of the device and that are referred to as "initial" rights;
  a module for sending to the device a description message containing a list of rights that may be allocated to the selected object, which allocatable rights are defined on the basis of the initial rights;
  a module for receiving, from the device, a request message requesting that rights be set up, the message comprising a description of the rights belonging to the object, referred to as "delegated" rights as selected from the list of allocatable rights;
  a module for creating a communications profile associated with the delegated rights; and
  a module for sending the profile to the object in order to configure it.

In accordance with the invention, on successively receiving a signaling message coming from the communicating object and a request to set up rights coming from a configuration request device, the rights management platform creates and generates access rights that are specific to the communicating object.

The access rights allocated to the communicating object, referred to as "delegated" rights, are remarkable in that they are obtained from initial access rights associated with a subscription a user has taken out with a network operator in order to access the communications network. By way of example, the initial rights correspond to an unlimited Internet, data, and voice subscription via the communications network. The initial rights also specify a number of communicating objects to which the user may grant delegated rights.

Since the initial and delegated rights are associated with a single subscription, the invention thus enables a user to take out a single subscription with a communications network that enables the user to connect a set of communicating objects. There is no need to have distinct subscriptions for authorizing distinct communicating objects to connect with the communications network.

Advantageously, by using the configuration request device, the user can define the extent of the delegated rights that the user seeks to allocate to the communicating object. When the communications network has a plurality of access networks, such as for example a cellular access network and a WiFi access network, the user of a communicating object that has means available for communicating both with a cellular network and with a WiFi network, can thus choose to allow the communicating object to access only one of these two access networks, or on the contrary to access both of them, depending on the delegated rights that the user allocates to the object.

In a particular implementation of the invention, the steps of creating and sending the profile are performed only if the request to set up rights is received by the platform within a predetermined time interval measured from receiving the signaling message.

Specifying a predetermined time interval serves to take account of unexpected delays in sending messages through the communications network and makes it possible to abandon configuring the current delegated rights automatically in the event of the delay being greater than the predetermined time interval.

In a second aspect, the invention also provides a method of requesting configuration of a communicating object, the method being performed by a communications device having rights to access a communications network associated with a user of the device, which rights are referred to as "initial" rights. The method comprises:
- a step of receiving from a rights management platform of the network a list of at least one identifier of a communicating object;
- a step of selecting a communicating object from the list and of sending an identifier of the selected object to the platform;
- a step of receiving a message containing a list of rights that may be allocated to the selected object, which allocatable rights are defined by the platform on the basis of the initial rights; and
- a step of transmitting to the platform a request for setting up rights specific to the object as selected from the list of allocatable rights, and referred to as "delegated" rights.

Correspondingly, the invention also provides a configuration request device for requesting configuration of a communicating object, the device having rights to access a communications network that are associated with a user of the device and that are referred to as "initial" rights. The device comprises:
- a module for receiving from a rights management platform of the network a list of at least one identifier of a communicating object;
- a module for selecting a communicating object from the list and of sending an identifier the selected object to the platform;
- a module for receiving a message containing a list of rights that may be allocated to the selected object, which allocatable rights are defined by the platform on the basis the initial rights; and
- a module for transmitting to the platform a request for setting up rights specific to the object as selected from the list of allocatable rights, and referred to as "delegated" rights.

The invention also provides a communications terminal comprising a configuration request device.

When a user seeks to allocate delegated rights to a communicating object via an application on a communications terminal of the invention, the user views a list of communicating objects that are to be found in the proximity of the communications terminal. It should be observed that this list of communicating objects may contain communicating objects that do not belong to the user. In order to lift such ambiguity, on presentation of this list of communicating objects, the user selects the object to which the user seeks to allocate access rights and the terminal transmits the identifier of the selected object to the management platform.

In a particular implementation of the invention, the selected object is selected from a set of at least one communicating object that has sent an information message to the device indicating that it has previously sent a signaling message to the platform.

In other words, after sending a signaling message to the rights management platform via an access point of the communications network, the communicating object also signals its presence to communications terminals that are located in its immediate environment. This second signaling may for example take place via a communication channel set up using a short range data and communication standard of the Bluetooth type or of the near field communication (NFC) type.

Advantageously, it is also possible to improve the experience of the user by limiting the list of communicating objects that are presented to the user to communicating objects that are located simultaneously at a short range from the communications terminal and in the proximity of an access point of the communications network.

In a third aspect, the invention also provides a method of obtaining rights for a communicating object to access a communications network, the communicating object initially having rights that are limited to exchanging data with a rights management platform of the network, the method being performed by the communicating object. The method comprises:
- a step of sending a signaling message to the platform; and
- a step of receiving a communications profile specific to the network, the profile being associated in the network with rights specific to the object, referred to as "delegated" rights, the delegated rights being defined on the basis of network access rights, referred to as "initial" rights, and associated with a user of the object;
- the delegated rights being adapted to enable the communicating object to access the communications network.

Correspondingly, the invention also provides a communicating object initially having rights limited to exchanging data with a rights management platform of a communications network. The communicating object comprises:
- a module for sending a signaling message to the platform; and a module for receiving a communications profile specific to the network, the profile being associated in the network with rights specific to the object, referred to as "delegated" rights, the delegated rights being defined on the basis of network access rights, referred to as initial rights, associated with a user of the object;

the delegated rights being adapted to enable the communicating object to access the communications network.

The network configures the communicating object by providing it with delegated access rights enabling it to access the communications network via access points that are compatible with its communications means, which access points are also adapted to receive requests to access the network coming from communicating objects and to relay such requests to the network, which takes care of performing network authentication with such objects.

Advantageously, the communicating object accesses the network without any prior need to be paired with an access gateway and without the communicating object having its own subscription to the communications network.

In a particular implementation of the invention, the communications profile is received via a secure channel set up between the rights management platform and a secure element of the communicating object.

By way of example, the secure element is an embedded SIM (eSIM) that is preconfigured during creation of the communicating object by its manufacturer. In particular, the secure element stores information associated with the manufacturer of the communicating object, e.g. a public key certificate, a private key associated therewith, and a unique identifier for the communicating object.

The use of a secure communication channel makes it possible to transmit the communications profile to the secure element of the communicating object even though, at this stage, the communicating object has only limited rights of access to the network.

Furthermore, transmission via a secure channel makes it possible to ensure that information exchanged between the secure element of the communicating object and the rights management platform is confidential.

By way of example, the secure channel may be set up on the basis of using a private key of the RSA type associated with the certificate of the manufacturer of the object as saved in the secure element.

In a particular implementation of the invention, the rights obtaining method includes, prior to the reception step, a step of sending an information message to at least one communications device, which message indicates that the communicating object has previously sent the signaling message.

As mentioned above, and advantageously, communications terminals receiving this information message can limit the list of communicating objects they present to their users to only those objects that are situated simultaneously at a short range therefrom and in the proximity of an access point of the communications network.

In a particular implementation, the various steps of the rights obtaining method, of the configuration request method, and of the rights management method are determined by computer program instructions.

Consequently, the invention also provides a computer program on a data medium, the program being suitable for being performed in a communicating object, the program including instructions adapted to performing steps of a rights obtaining method as described above.

The invention also provides a computer program on a data medium, the program being suitable for being performed in a communications terminal, the program including instructions adapted to performing steps of a method of requesting configuration of a communicating object, as described above.

The invention also provides a computer program on a data medium, the program being suitable for being performed in a rights management gateway or more generally in a computer, the program including instructions adapted to performing steps of a rights management method as described above.

These programs may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), a random access memory (RAM), a programmable read only memory (EPROM), an electrical programming read only memory (EEPROM), or a compact disk (CD) ROM, or indeed magnetic recording means, such as a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In a fourth aspect, the invention also provides a rights management system comprising:

at least one communicating object of the invention;

a rights management platform of the invention; and at least one configuration request device of the invention.

BRIEF DESCRIPTION OF THE DRAWINGS

Particular characteristics and advantages of the present invention appear from the detailed description made with reference to the figures, in which.

DETAILED DESCRIPTION OF THE INVENTION

Figure 1:
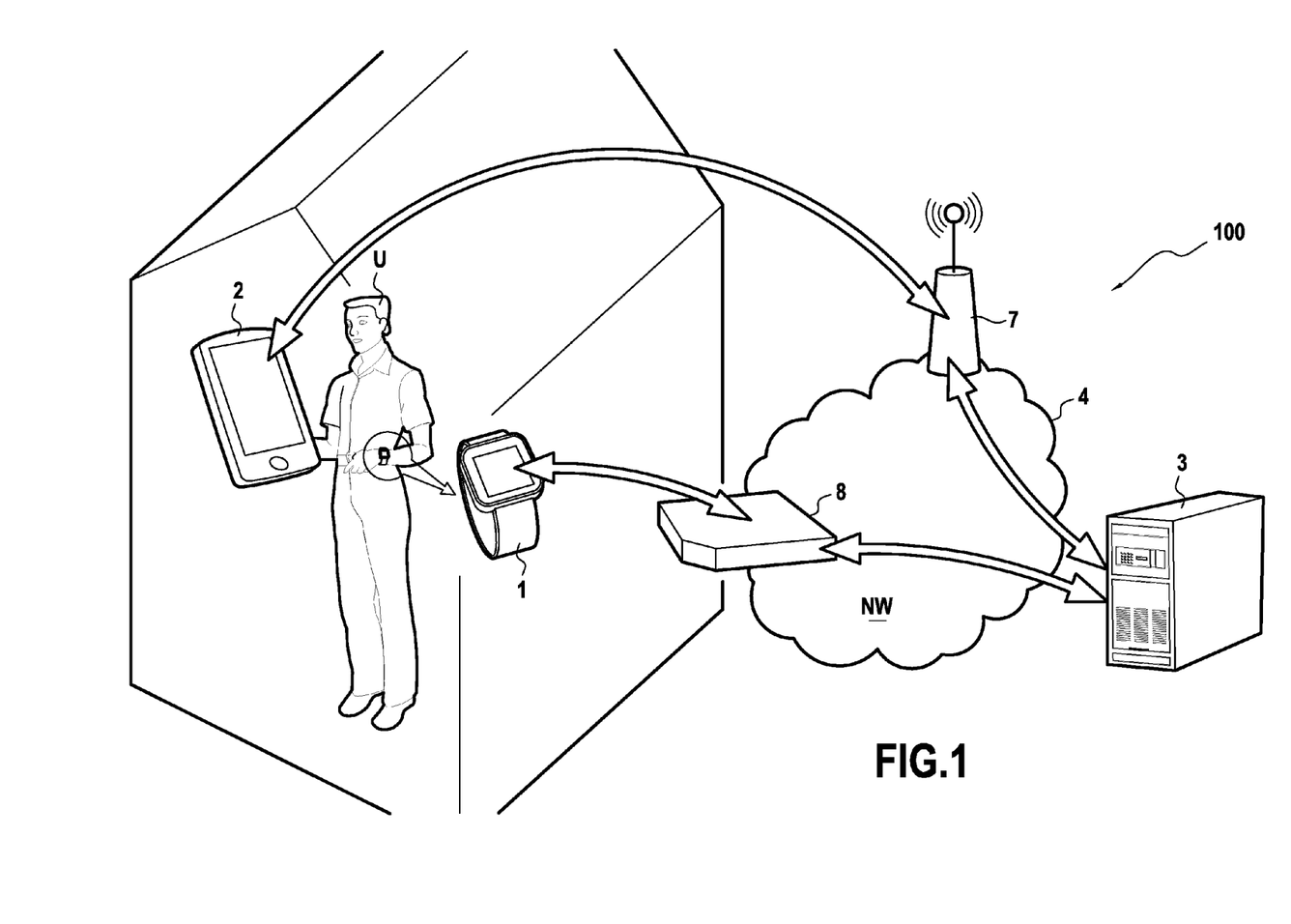
FIG. 1 shows a first example of a rights management system in an embodiment of the invention.

FIG. 1 shows, in its environment, a particular embodiment of an access rights management system 100 in accordance with the invention.

In accordance with the invention, the access rights management system 100 relies on three-part architecture enabling a user U to allocate access rights to a communicating object 1 by means both of a communications terminal 2 that constitutes a configuration request device and also of an access rights management platform 3, with the rights that are allocated being associated with a subscription of the user U, such as a subscription taken out with a network operator. The subscription enables the user to access services of a communications network 4.

The system 100 comprises:
the communicating object 1;
the communications terminal 2 of the user U; and
the rights management platform 3.

A communicating or connected object is an object suitable for exchanging information via a communications network with another object, or with a communications terminal, or indeed with computer equipment of the communications network. Thus, a mobile terminal, a watch adapted to transmit information to a mobile terminal via an extended communications network such as the Internet, and a smoke detector adapted to communicate with a remote mobile terminal in order to signal the presence of smoke in a house, all constitute examples of connected objects. In the presently-described example, the communicating object 1 is a watch that is adapted to measure physical characteristics of the user wearing it, e.g. the user's heart rate, and to transmit the measurements to a remote computer device (not shown in FIG. 1) adapted to process the measurements over given periods.

The communications network 4 has at least one access network to an extended communications network, e.g. the Internet. The access network may be a mobile network, e.g. a universal mobile telecommunications system (UMTS), or it may be a fixed network, e.g. an Ethernet network that may be wired or wireless, e.g. using a WiFi access network, etc.

The communicating object 1 is a communicating object in accordance with the invention. Its hardware architecture is shown diagrammatically in FIG. 2. Thus, the communicating object 1 comprises in particular a processor 1A, a ROM 1B, a RAM 1C, a non-volatile memory 1D, a communications module 1E for communicating over the communications network 4, and a secure element 1F.

Figure 2:
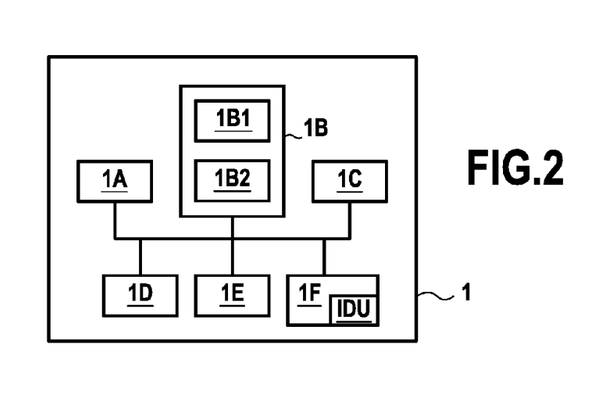
FIG. 2 shows an example of hardware architecture for a communicating object of the invention.

The communicating object 1 is granted delegated rights by the user U in compliance with the rights obtaining method of the invention. The delegated rights comprise a communications profile adapted to enable the communicating object to access some or all of the services provided by the communications network 4. The delegated rights are derived from initial rights associated with the user U in the context of a subscription the user has taken out with a network operator in order to access the communications network 4. For example, the subscriber U may possess a subscription giving the user unlimited data and voice access to the mobile network. It is assumed that the subscription also makes provision for the user U to have the right to connect some given number of communicating objects. Thus, on the basis of these initial rights, delegated rights are generated for the communicating object 1 enabling the communicating object 1 to access the network in data mode for a determined duration, to download a limited quantity of data, etc. The rights delegated to the communicating object are granted by the user U and they are derived from the user's initial access rights. It can be understood that the delegated rights, and more precisely the characteristics specific to accessing the network as granted by the user U to one of the user's communicating objects remain within the scope of the initial rights. For example, the duration during which the communicating object may communicate, and the quantity of data that it may download and send, are equal to or less than values agreed when the user U takes out the subscription.

The secure element 1F stores information associated with the manufacturer of the communicating object 1, e.g. a public key certificate, an associated private key, and a unique identifier IDU of the communicating object 1. By way of example, this information is for enabling a first authentication of the communicating object 1 and for setting up a secure communication channel with the rights management platform 3 of the communications network 4. The certificate and the private key were delivered and installed by the manufacturer of the communicating object 1 during its manufacture. The certificate is for identifying the object and its manufacturer. While allocating delegated rights to the communicating object, a network operator may choose to give rights only to communicating objects made by certain manufacturers. In conventional manner, the private key is for use in authenticating the communicating object 1. The secure element 1F is also arranged to store a communications profile comprising data enabling the communicating object 1 to access the communications network 4. The communications profile is delivered by the communications network 4 and comprises data for accessing the network. In conventional manner, the profile comprises an authentication key $K_i$ and an identifier of the international mobile subscriber identity (IMSI) number type that enables the network to identify the user U. The secure element 1F is also arranged to receive from the network and to store cryptographic algorithms that are used when accessing the network.

The secure element 1F may for example of the embedded subscriber identity (eSIM) type.

In a variant, the secure element 1F is a secure environment.

The ROM 1B of the communicating object 1 constitutes a data medium readable by the processor 1A that stores a computer program in accordance with the invention including instructions for executing steps of a rights obtaining method in accordance with the invention, the steps of the rights obtaining method being described below with reference to FIG. 5 in a particular implementation.

In equivalent manner, the computer program defines functional modules of the communicating object 1, such as a module 1B1 for sending a signaling message to the rights management platform 4, and a module 1B2 for receiving a communications profile specific to the network 4, this profile being associated in the network with rights specific to the object 1, referred to as "delegated" rights. The functions of these modules are described in greater detail with reference to the steps of the rights obtaining method shown in FIG. 5.

Figure 3:
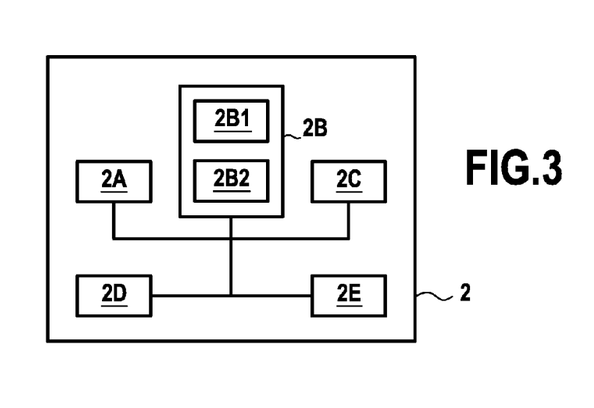
FIG. 3 shows an example of hardware architecture for a configuration request device of the invention.

The architecture of a communications terminal 2 constituting an example of a configuration request device in an embodiment is described below with reference to FIG. 3.

The communications terminal 2 comprises a processor 2A, a ROM 2B, a RAM 2C, a non-volatile memory 2D, and a communications module 2E.

The ROM 2B of the communications terminal 2 constitutes a data medium readable by the processor 2A and storing a computer program in accordance with the invention including instructions for executing steps of a configuration request method in accordance with the invention, the steps of this method being described below with reference to FIG. 5 in a particular implementation.

By way of example, the program is executed in a secure environment of the trusted execution environment (TEE) type of the communications terminal.

In equivalent manner, the computer program defines functional (software) modules of the communications terminal 2, such as in particular a module 2B1 for communicating with the rights management platform 3 and a module 2B2 for selecting a communicating object from a list of communicating objects. Their functions are described in greater detail below with reference to the steps of the configuration request method shown in FIG. 5.

No limitation is associated with the nature of the communications terminal 2 which may, by way of example and as shown in FIG. 1, be a smartphone enabling the user U to access the communications network 4 in accordance with the subscription previously taken out with the operator of the network 4.

The subscription associates the user U with initial rights as described above specifying the services of the communications network 4 that are accessible to the user or characteristics of access to the network. In the presently-described example, the initial rights correspond to an unlimited Internet, data, and voice subscription via the communications network 4, these initial rights also allowing delegated rights to be allocated to a maximum number of two connected objects.

The rights associated with the subscription of the user U are managed by the rights management platform 3.

Figure 4:
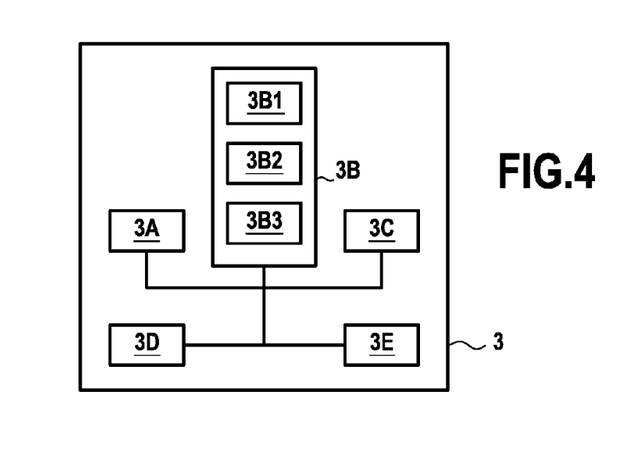
FIG. 4 shows an example of hardware architecture for a rights management platform of the invention.

The rights management platform 3 is described below with reference to FIG. 4.

The platform 3 comprises a processor 3A, a storage memory 3B of the flash memory or the electrically erasable programmable read only memory (EEPROM) type, a RAM 3C, a non-volatile memory 3D, and a communications module 3E. The platform 3 may rely on a home location register (HLR) of cell phone networks.

The storage memory 3B of the rights management platform 3 constitutes a data medium readable by the processor 3A that stores a computer program in accordance with the invention including instructions for executing steps of a rights management method in accordance with the invention, the steps of the management method being described below with reference to FIG. 5, in a particular embodiment.

In equivalent manner, the computer defines functional (software) modules of the rights management platform 3, such as, in particular, a module 3B1 for communicating with the communicating object 1, a module 3B2 for communicating with communications terminal, and a module 3B3 for creating a communications profile. Their functions are described in greater detail below with reference to the steps of the management method shown in FIG. 5.

Figure 5:
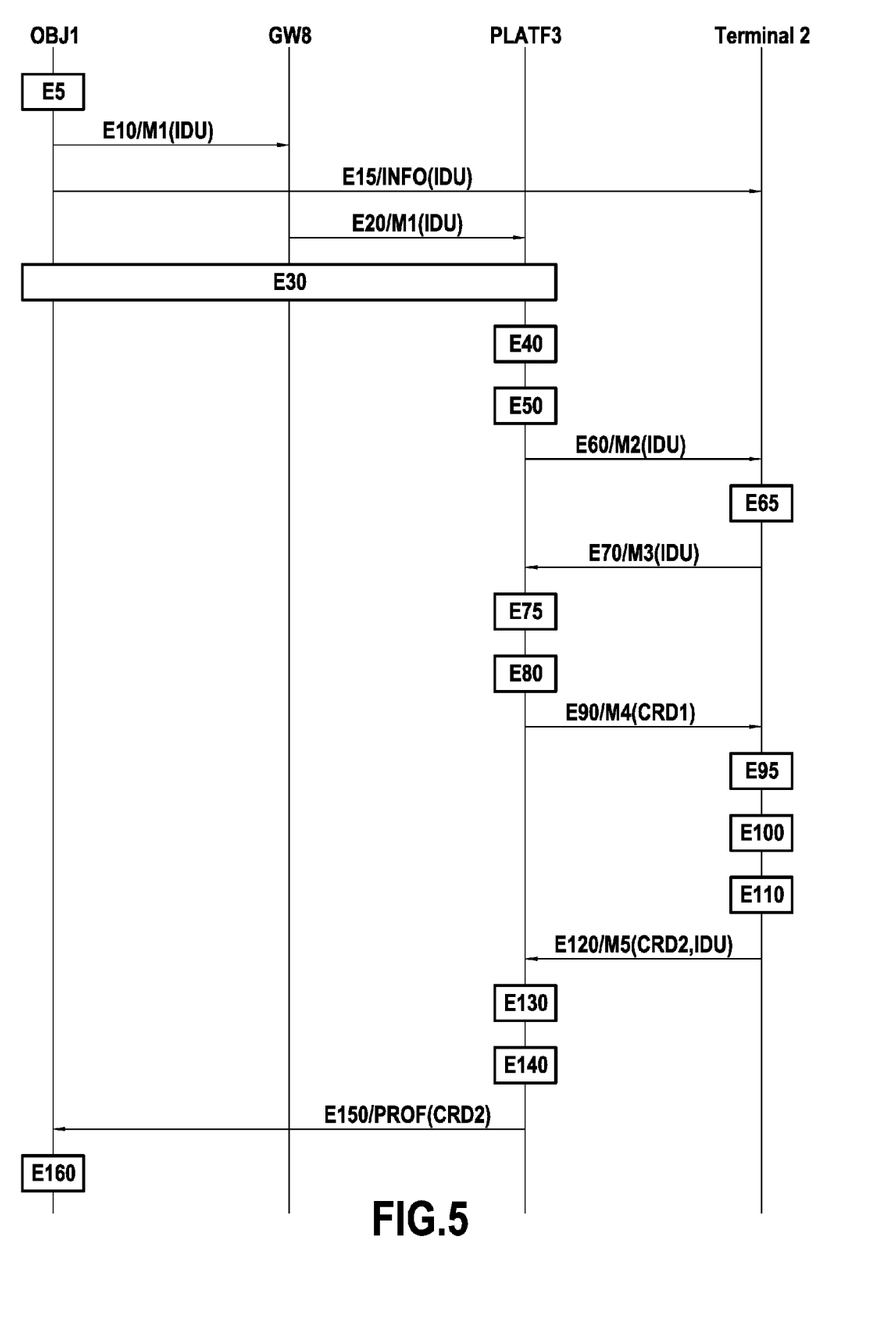
FIG. 5 shows the main steps of a rights obtaining method, a configuration request method, and a management method in a particular implementation of the invention.

With reference to FIG. 5, there follows a description of the steps of the rights obtaining method performed by the communicating object 1, of the steps of the configuration request method performed by a communications terminal 2 that constitutes a configuration request device, and the steps of a management method performed by the rights management platform 3 in a first implementation of the invention.

In the presently-described first example corresponding to the system described with reference to FIG. 1, the communications network 4 comprises a first access network that is a cellular network accessible via an access node 7 such as a base station or an eNodeB, and also a second access network that is a wireless network giving access to the extended communications network that is accessible via an access gateway 8.

The communicating object 1 is a connected watch, having a communications module 1E suitable for connecting to the wireless access network of the communications network 4.

The communications terminal 2 is a smart terminal enabling the user U, by virtue of that user's subscription, to connect to the communications network 4 via the access node 7 of the cellular access network.

In order to access the communications network 4 via the access node 7, the user has received a SIM card that is inserted in the terminal 2 and that enables the communications network 4 to authenticate the user U and to identify the access rights allocated to the terminal 2.

The user U has initial access rights associated with the user's subscription that defines the resources available to the user when accessing the communications network 4. For example, the subscriber U may take out a subscription giving access to the voice and data network and to unlimited Internet. In this example, the initial rights enable delegated rights to be allocated to two connected objects. The initial rights are stored in a rights database (not shown in FIG. 1) that is situated in the communications network 4, e.g. in the rights management platform 3.

On initialization, the communicating object 1 has no more than access rights that are limited to exchanging data with the rights management platform 3. The limited access enables the communicating object 1 to have access to the network, but without being able to transmit data to other objects or terminals. The limited access of the communicating object 1 is for the purpose of maintaining its connectivity with the network until delegated rights have been allocated thereto. This limited access is always provided to all objects possessing a personalized secure element made by a manufacturer recognized by the operator of the network.

In an initial step E5, the user U initiates the allocation of delegated rights to the communicating object 1, e.g. by selecting a configuration option that is accessible from a man/machine interface of the communicating object 1.

In response to the action of the user U, the communicating object 1 acts during a step E10 to send a signaling message M1 to the rights management platform 3 of the communications network 4.

The signaling message M1 includes in particular the unique identifier IDU of the communicating object 1, this unique identifier IDU being stored in the secure element 1F of the communicating object 1. As described above, the secure element 1F is personalized on being manufactured by recording the identifier IDU therein, together with a certificate signed by the manufacturer of the object or by a third-party trusted authority, and also a private key associated with the certificate.

In the presently-described example, the message M1 is sent by means of the communications module 1E of the connected object 1, over a communication channel set up with the home gateway 8 in accordance with the WiFi protocol.

In a variant, the message M1 is sent over a communication channel of the Bluetooth or near field communication (NFC) type.

In a following step E15, the communicating object 1 sends an information message INFO containing its identifier IDU to all of the communications terminals situated within its vicinity. This information message INFO indicates that the communicating object 1 has previously sent a signaling message M1 to the platform 3. The information message INFO is for suggesting that the user should allocate delegated rights only to objects that have sent this message.

The home gateway 8 is configured to receive signaling messages coming from communicating objects 1 and to transfer those signaling messages to the rights management platform 3. The message M1 is thus received by the home gateway 8 and retransmitted to the rights management platform 3 of the communications network 4 during a step E20.

In a following step E30, the rights management platform 3 authenticates the communicating object 1 and sets up a secure communication channel with the secure element 1F of the communicating object 1. Authentication relies on a known method that is not described in detail herein, making use of the private key and the certificate stored in the secure element 1F of the connected object 1.

The rights management platform 3 also acts (in a step E40) to identify the communications terminals that are situated in the proximity of the communicating object 1. To do this, the rights management platform 3 determines the geographical location of the gateway 8 from the IP address of the gateway 8. The connected object 1 is in fact situated in the proximity of the gateway 8. Furthermore, the rights management platform 3 geolocates the communications terminals in positions that are at a distance less than a predetermined value from the position of the gateway 8, where this predetermined value is selected as a function of the accuracy of the geolocation technique used.

In a variant, the rights management platform 3 can geolocate the communications terminals on the basis of location information sent by the communications terminals to the platform 3.

The rights management platform 3 acts during a step E50 to draw up a list of identifiers of communicating objects that have requested the allocation of rights to access the network 4 during a predetermined length of time prior to receiving the signaling message M1. It should be observed that this list contains at least the identifier IDU of the communicating object 1.

The rights management platform 3 then acts (in a step E60) to transmit an identification message M2 to the terminals that were identified during step E40, which message M2 includes the list of identifiers drawn up during step E50.

In a following step, the user U (in a step E65) uses the communications terminal 2 connected to the communications network 4 to view the list of communicating objects that are located in the proximity of the terminal 2, as received from the platform 3.

In a variant, the user U views, on the terminal 2, those communicating objects that belong to the list received from the platform 3 and that have sent an information message INFO to the terminal 2 during the step E15 indicating that they have also previously sent a signaling message to the platform 3. The information message INFO thus makes it possible to limit the number of communicating objects in the list shown to the user. It can be understood that in a dense geographical zone, this function can serve to avoid the user receiving too long a list of objects.

During a step E65, the user U also selects the communicating object 1 in the list of communicating objects shown on the terminal 2. By making this selection, the user confirms that the user is seeking to allocate delegated rights to the communicating object 1.

Thereafter (in a step E70), the terminal 2 transmits a message M3 to the platform 3 containing the identifier IDU of the communicating object 1 selected by the user U.

On receiving the message M3, the rights management platform 3 identifies (in a step E75) the user U of the terminal 2 and determines (in a step E80), on the basis of the initial rights allocated to the user U, the rights CRD1 that can be allocated to the communicating object 1.

In a following step E90, the rights management platform 3 transmits a message M4 to the terminal 2 containing a list of rights that may be allocated to the communicating object 1. The list of such allocatable rights is generated from the initial rights of the user and comprises rights to access the network that may be delegated to the communicating object 1. The allocable rights are identified so as to remain within the scope of the initial rights.

The user U (in a step E95) views on the communication terminal 2 the list of rights that may be allocated to the communicating object 1 and, during a step E100, defines the delegated rights CRD2 that the user seeks to allocate to the communicating object 1. In the presently-described example, the user U seeks to allocate to the communicating object 1 the right to access the second access network of the communications network 4, i.e. the wireless access network.

During a step E110, the terminal 2 then generates a request message M5 for setting up delegated rights containing the identifier IDU of the selected communicating object 1 together with the delegated rights CRD2 as selected by the user, specifically the right to access the communications network via its second access network.

During a step E120, the terminal 2 then sends to the management platform 3 the message M5 requesting that delegated rights be set up.

During a step E130, the rights management platform 3 then verifies that the message M5 requesting that rights be set up and coming from the communications terminal 2 and the signaling message M1 coming from the communicating object 1 have both been received within a predetermined time interval T. The time interval T serves to take account of the time required for the user U to be able to make a selection on the terminal 2 and of the usual delays involved when sending messages over the communications network, and it automatically abandons configuring the current delegated rights in the event of the time period being longer than the settable time interval T.

In a following step E140, the rights management platform 3 creates a communications profile PROF for the connected object 1 and stores the rights granted to the connected object 1 in the rights database. The communications profile PROF includes in particular an authentication key $Ki_1$ and an identifier $IMSI_1$ for enabling the communicating object 1 to access the communications network 4. Activating the profile PROF consists in adding information in the database associated with the HLR, including in particular the authentication key $Ki_1$ and the number $IMSI_1$ associated with the communicating object 1.

In a following step E150, the rights management platform 3 then transmits the communications profile PROF created for the communicating object 1 to the secure element 1F of the object 1. The profile PROF is transmitted via the secure communication channel set up between the secure element 1F of the connected watch 1 and the management platform 3.

After saving (in a step E160), the communications profile PROF as received from the rights management platform 3, the communicating object 1 can access the communications network 4 using these rights that belong to it.

Thus, by means of the rights obtaining method, the communicating object 1 can access the network 4 via any access point that is compatible with its delegated rights and its communications module 1E, the other access points being adapted to receive requests to access the network coming from the communicating object 1 and for relaying those requests to the network which takes care of performing network authentication with the communicating object 1.

In the above-described example, the connected object 1 can thus access the network via the gateway 8 or via a second gateway (not shown in FIG. 1) that is different from the gateway 8 of the user U. By way of example, the second gateway may be a public access point managed by the operator of the communications network 4.

In a variant, the second gateway is a home gateway of some other user of the network 4, which home gateway has been configured to receive requests to access the network coming from any communicating object in accordance with the invention and to relay those requests to the network.

Thus, the second gateway incorporates a remote access server (RAS) function. The RAS function enables objects that have obtained delegated access rights to connect to the Internet via the second gateway in compliance with the following procedure. The communicating object 1 sends a connection request containing its $IMSI_1$, and the second gateway informs the HLR of the request from the object. The HLR responds by transmitting a data set to the second gateway, enabling the gateway to authenticate the object and to encrypt the data exchanged over the radio part between the object and the second gateway. This data is in particular of the following step: {(Rand 1, XResp1, Kc1, . . . ); (Rand 2, XResp2, Kc2, . . . ); (Rand 3, XResp3, Kc3, . . . ); (Rand 4, XResp4, Kc4, . . . ); . . . (Rand n, XRespn, Kcn, . . . )} where the data Kci comprises data encryption keys for use over the radio link between the communicating object 1 and the second gateway. The second gateway sends the challenge "Rand 1" to the communicating object 1. The object calculates a response Resp1 (depending on Rand 1 and on $Ki_1$ and transmits it to the second gateway. The gateway then compares Resp1 with XResp1 (expected response 1, as specified by the HLR). If the two responses are identical, then the object is authenticated and the second gateway provides it with the parameters for connection to the Internet: IP address, DNS address, default gateway address, etc. At regular time intervals, the second gateway re-authenticates the communicating object 1 by sending it a new Rand i.

Thereafter, on request of the user U, the rights management platform 3 transmits to the terminal 2 the list of communicating objects that are associated with the subscription of the user U.

The user can thus view on the terminal 2 all of the objects associated with the user's subscription.

In an implementation, the user U can withdraw the delegated rights that have previously been granted to a communicating object, either because the object has been sold to a third party, or because the object has been stolen or lost etc.

The use U can select the communicating object 1 from a menu on the communications terminal 2. The communications terminal 2 transmits a de-association message concerning the communicating object 1 to the rights management platform 3.

On receiving this de-association message, the rights management platform 3 deactivates the communications profile of the communicating object 1. Deactivating the profile consists in deleting from the authentication center of the network the data comprising the authentication key $Ki_1$ and the number $IMSI_1$ associated with the communicating object 1 when the delegated rights were created. From this moment on, the communicating object 1 can no longer access the communications network 4.

The rights management platform 3 can also, on receiving the de-association message, send a deactivation message concerning the rights to the secure element 1F of the communicating object 1.

Figure 6:
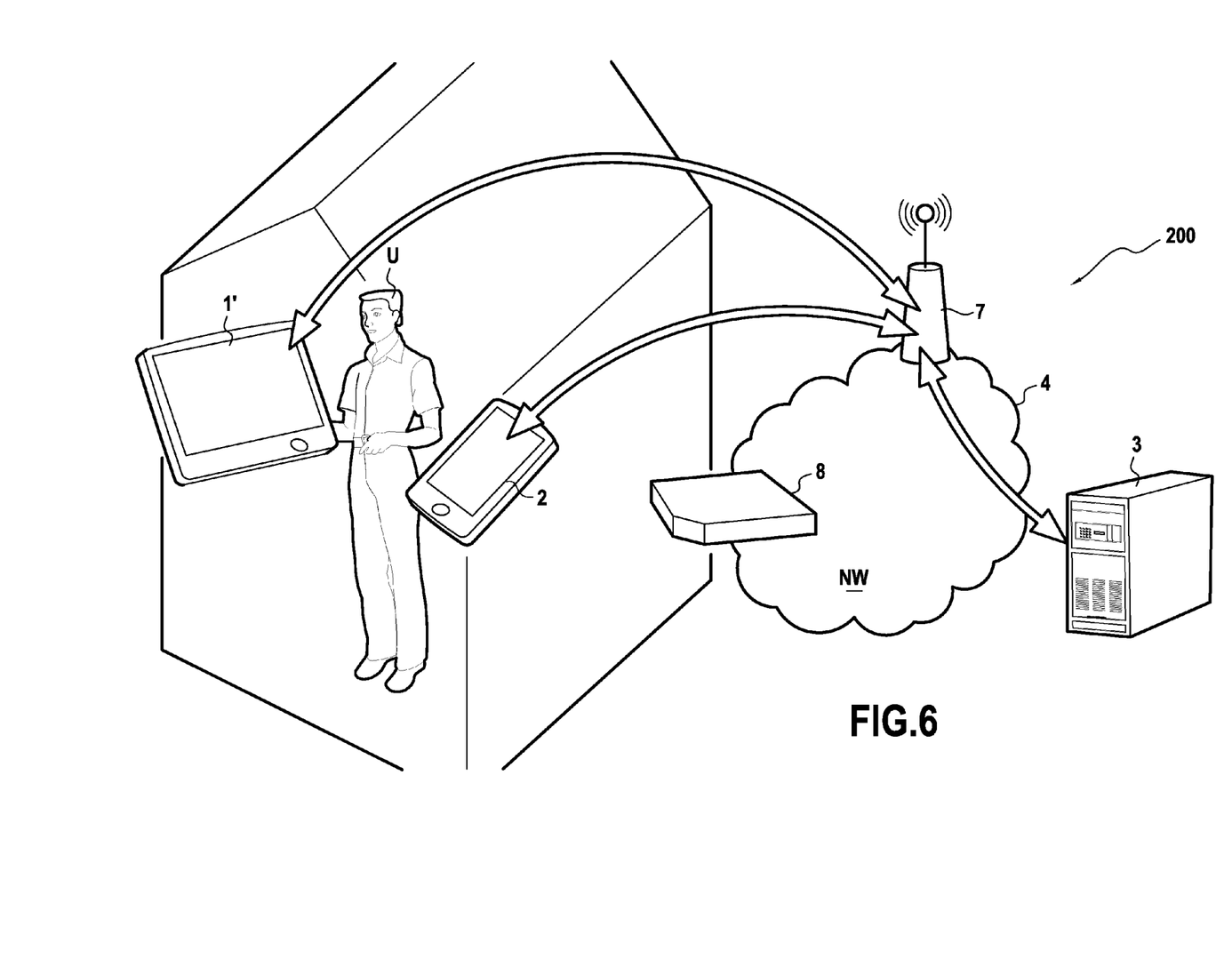
FIG. 6 shows a second example of a rights management system in an embodiment of the invention.

With reference to FIG. 6, there follows a description of a second embodiment of the invention.

For reasons of simplification, identical references are given in this figure to elements that are in common with the first embodiment shown in FIG. 1.

In this second embodiment, the rights management platform 200 comprises:

a communicating object 1';
the communications terminal 2 of the user U; and
the rights management platform 3.

In this embodiment, the communicating object 1' also has a modem for access to the 3G/4G cellular network that enables it to access the communications network 4 via access nodes. By way of example, the communicating object 1' is a touch tablet and its communications module is suitable for connecting both to the WiFi access network also and to the cellular network.

In the presently-described embodiment, the user U also has initial rights corresponding to an Internet and mobile subscription to the communications network 4, these initial rights also enabling delegated rights to be allocated to a maximum number of two connected objects.

In accordance with the invention, the user U initiates the sending of a signaling message M1' to the communications network 4 from the touch tablet 1'.

The signaling message M1' may pass equally well via the cellular access network or via the WiFi access network. By way of example, the communicating object 1' selects the access network that provides the greater bandwidth. When the signaling message passes via the WiFi network, the message is received by the home gateway 8 that is configured to receive signaling requests coming from communicating objects and to transfer to the rights management platform 3. When the signaling message M1' passes via the cellular network, the message is received by an access node 7, which relays it to the rights management platform 3. Either way, at this stage, access to the network for the communicating object 1' is limited.

On receiving the signaling message M1', the rights management platform 3 authenticates the communicating object 1' and sets up a secure communication channel with the secure element 1F of the communicating object 1'.

The rights management platform 3 identifies the communication terminals that are situated in the proximity of the communicating object 1' as described above for step E40. When the nominal access point is the access node 7, the platform 3 may use any known method for determining the position of the communicating object 1'. For example, it is possible to use a triangulation method. The rights management platform 3 draws up a list of identifiers of communicating objects that have requested the allocation of delegated rights, as in above-described step E50. The rights management platform 3 then transmits (in a step E60) an identification message M2' to the identified terminals, which message comprises the list of identifiers drawn up during step E50.

The user U views on the communications terminal 2 the list of communicating objects located nearby and selects the communicating object 1' to which the user seeks to grant delegated rights (step E65).

The terminal 2 then transmits (step E70) a message M3' to the platform 3, which message contains the identifier IDU' of the communicating object 1' selected by the users U.

On receiving the message M3', the rights management platform 3 identifies (step E75) the user U of the terminal 2 and determines (step E80) on the basis of the initial rights allocated to the user U, what rights CRD1' may be allocated to the communicating object 1.

In a following step E90, the rights management platform 3 transmits a message M4' to the terminal 2, which message contains the list of rights that may be allocated to the communicating object 1'.

The user U views (step E95) on the communications terminal 2 the list of rights that may be allocated to the communicating object 1' and during a step E100 defines the delegated rights CRD2' that the user seeks to allocate to the communicating object 1'. In the presently-described embodiment, the user U seeks to allocate to the communicating object 1' a right to access the cellular access network of the communications network 4.

During a step E110, the terminal 2 then generates a message M5' requesting that delegated rights CRD2' be set up containing the identifier IDU' of the selected communicating object 1 together with the delegated rights CRD2' as selected by the user, and specifically the right to access the communications network via the cellular access network.

Thereafter, during a step E120, the terminal 2 sends the message M5' to the management platform 3 requesting that the delegated rights be set up.

The rights management platform 3 then acts during a step E130 to verify that the message M5' requesting the setting up of rights coming from the communications terminal 2 and the signaling message M5' coming from the communicating object 1 were received within a predetermined time interval T. The time interval T serves to take account of unexpected delays in sending messages over the communications network 4 and to enable the ongoing configuration of delegated rights to be abandoned automatically when the time period is longer than the settable time interval T.

In a following step E140, the rights management platform 3 creates a communications profile for the connected object 1' and registers the rights allocated to the connected object 1' in the rights database.

In a following step E140, the rights management platform 3 then transmits (in a step E150) the communications profile created for the communicating object 1' to the secure element 1F' of the object 1'. This transmission of delegated rights CRD2' takes place the secure communication channel set up between the secure element 1F' of the communicating object 1' and the management platform 3.

After saving (in a step E160) the communications profile received from the rights management platform 3, the communicating object 1' can access the communications network 4 by using these rights that belong thereto via cellular access points to the communications network 4.

An exemplary embodiment of the present invention serves in particular to mitigate the drawbacks discussed above with respect to the prior art.

Although the present disclosure has been described with reference to one or more examples, workers skilled in the art will recognize that changes may be made in form and detail without departing from the scope of the disclosure and/or the appended claims.

The invention claimed is:

1. A management method comprising:
managing access rights to a communications network, by a rights management platform of the communications network, wherein the rights management platform comprises a processor and a non-transitory computer-readable medium comprising instructions stored thereon, and wherein the rights management platform performs the following acts:

receiving at least one identifier of at least one communicating object in at least one signaling message sent over the communications network;

sending to a configuration request device a list comprising the at least one identifier of at least one of the communicating objects, which is located in proximity of the configuration request device, each of the communicating objects comprising a communications module able to exchange information over the communications network, and wherein the configuration request device communicates with the rights management platform through the communications network;

receiving, from the configuration request device, a message comprising the identifier of a selected communicating object of the at least one communicating object in the list, the configuration request device having rights to access the communications network that are associated with a user of the configuration request device and that are referred to as "initial" rights;

sending to the configuration request device a description message containing a list of rights that may be allocated to the selected communicating object, which allocatable rights are defined on the basis of the initial rights;

receiving, from the configuration request device, a request message requesting that rights be set up, the message comprising a description of the rights belonging to the selected communicating object, referred to as "delegated" rights as selected from the list of allocatable rights;

creating a communications profile associated with the delegated rights; and sending the communications profile to the selected communicating object in order to configure the selected communicating object.

2. The management method according to claim 1, wherein the creating and sending the profile are performed only if the request to set up rights is received by the platform within a predetermined time interval measured from receiving the signaling message).

3. A method performed by a configuration request device having rights to access a communications network associated with a user of the configuration request device, which rights are referred to as "initial" rights, wherein the configuration request device comprises a processor and a non-transitory computer-readable medium comprising instructions stored thereon, the method comprising:

receiving from a rights management platform of the network a list of at least one identifier of at least one communicating object, which is located in proximity of the configuration request device, the rights management platform comprising a communications module able to exchange information with the configuration request device over the communications network, and each of the communicating objects comprising a communications module able to exchange information over the communications network;

selecting a communicating object from the list and sending an identifier of the selected communicating object to the rights management platform;

receiving from the rights management platform a message containing a list of rights that may be allocated to the selected communicating object, wherein the allocatable rights are defined by the rights management platform on the basis of the initial rights; and transmitting to the rights management platform a request for setting up rights specific to the selected communicating object of allocatable rights, and referred to as "delegated" rights.

4. A method performed by a communicating object, which comprises a processor, a non-transitory computer-readable medium comprising instructions stored thereon and a communications module able to exchange information over a communications network, wherein the method comprises:
obtaining rights for the communicating object to access the communications network, the communicating object initially having rights that are limited to exchanging data with a rights management platform of the communications network, wherein the communicating object performs the following acts:
sending a signaling message over the communications network to the rights management platform, the rights management platform comprising a communications module able to exchange information over the communications network;
sending an information message containing an identifier of the communicating object to a configuration request device located in proximity to the communicating object; and
receiving from the rights management platform a communications profile specific to the communications network, the communications profile being associated in the communications network with rights specific to the communicating object as selected by the configuration request device from a list of allocatable rights by the configuration request device, wherein the allocatable rights are referred to as "delegated" rights, the allocatable rights being defined on the basis of network access rights of the configuration request device associated with a user of the communicating object and referred to as "initial" rights;
the delegated rights being adapted to enable the communicating object to access the communications network.

5. The method of obtaining rights according to claim 4, wherein the communications profile is received via a secure channel set up between the rights management platform and a secure element of the communicating object.

6. The method of obtaining rights according to claim 4, wherein the act of sending the information message is performed prior to the act of receiving the communications profile, and wherein the information message indicates that the communicating object has previously sent the signaling message.

7. A non-transitory computer readable data medium storing a computer program including instructions for executing a method for requesting configuration, when the program is executed by a processor of a configuration request device, configuration request device having rights to access a communications network associated with a user of the device, which rights are referred to as "initial" rights, the program arranged to configure the communications device to perform the following acts:
receiving from a rights management platform of the network a list of at least one identifier of at least one communicating object, which is located in proximity of the configuration request device, the rights management platform and each of the communicating objects comprising a communications module able to exchange information over the communications network;
selecting a communicating object from the list and sending an identifier of the selected communicating object to the rights management platform;
receiving from the rights management platform a message containing a list of rights that may be allocated to the selected communicating object, wherein the allocatable rights are defined by the rights management platform on the basis of the initial rights; and
transmitting to the rights management platform a request for setting up rights specific to the selected communicating object of allocatable rights, and referred to as "delegated" rights.

8. A non-transitory computer readable data medium storing a computer program including instructions for executing steps of a method of obtaining rights for a communicating object to access a communications network, when the program is executed by a processor of the communicating object, said communicating object initially having rights that are limited to exchanging data with a rights management platform of said communications network, the program being arranged to configure the communicating object to perform acts comprising:
sending a signaling message over the communications network to the rights management platform, the rights management platform comprising a communications module able to exchange information over the communications network;
sending an information message containing an identifier of the communicating object to a configuration request device located in proximity to the communicating object; and
receiving from the rights management platform a communications profile specific to the communications network, the communications profile being associated in the communications network with rights specific to the communicating object as selected by the configuration request device from a list of allocatable rights by the configuration request device, wherein the allocatable rights are referred to as "delegated" rights, the allocatable rights being defined on the basis of network access rights of the configuration request device associated with a user of the communicating object and referred to as "initial" rights;
the delegated rights being adapted to enable the communicating object to access the communications network.

9. A rights management platform comprising:
a non-transitory computer-readable medium comprising instructions stored thereon; and
a processor, which is configurable by the instructions to perform acts comprising:
managing access rights to a communications network by performing the following acts:
receiving at least one identifier of at least one communicating object in at least one signaling message sent over the communications network;
sending to a configuration request device a list comprising the at least one identifier of at least one of the communicating objects, which is located in proximity of the configuration request device, each of the communicating objects comprising a communications module able to exchange information over the communications network, and wherein the configuration request device communicates with the rights management platform through the communications network;
receiving, from the configuration request device, a message comprising the identifier of a selected communicating object of the at least one communicating object in the list, the configuration request device having rights to access the communications network that are associated with a user of the configuration request device and that are referred to as "initial" rights;

sending to the configuration request device a description message containing a list of rights that may be allocated to the selected communicating object, which allocatable rights are defined on the basis of the initial rights;

receiving, from the configuration request device, a request message requesting that rights be set up, the message comprising a description of the rights belonging to the selected communicating object, referred to as "delegated" rights as selected from the list of allocatable rights;

creating a communications profile associated with the delegated rights; and sending the communications profile to the selected communicating object in order to configure the selected communicating object.

10. A configuration request device comprising:

rights to access a communications network that are associated with a user of the configuration request device and that are referred to as "initial" rights;

a non-transitory computer-readable medium comprising instructions stored thereon; and a processor, which is configurable by the instructions to perform acts comprising:

receiving from a rights management platform of the communications network a list of at least one identifier of at least one communicating object, which is located in proximity of the configuration request device, the rights management platform and each of the communicating objects comprising a communications module able to exchange information over the communications network;

selecting a communicating object from the list and sending an identifier of the selected communicating object to the rights management platform;

receiving from the rights management platform a message containing a list of rights that may be allocated to the selected communicating object, wherein the allocatable rights are defined by the rights management platform on the basis of the initial rights; and transmitting to the rights management platform a request for setting up rights specific to the selected communicating object of allocatable rights, and referred to as "delegated" rights.

11. A communicating object comprising:

initial rights limited to exchanging data with a rights management platform of a communications network, the rights management platform comprising a communications module able to exchange information over the communications network;

a non-transitory computer-readable medium comprising instructions stored thereon; and a processor, which is configurable by the instructions to perform acts comprising:

sending a signaling message to the platform; and sending an information message containing an identifier of the communicating object to a configuration request device located in proximity to the communicating object; and receiving from the rights management platform a communications profile specific to the communications network, the communications profile being associated in the communications network with rights specific to the communicating object as selected by the configuration request device from a list of allocatable rights by the configuration request device, wherein the allocatable rights are referred to as "delegated" rights, the allocatable rights being defined on the basis of network access rights of the configuration request device associated with a user of the communicating object and referred to as "initial" rights;

the delegated rights being adapted to enable the communicating object to access the communications network.

* * * * *